United States Patent
Oki

(10) Patent No.: US 9,955,037 B2
(45) Date of Patent: Apr. 24, 2018

(54) IMAGE FORMING SYSTEM, IMAGE FORMING APPARATUS AND PROGRAM WITH PARAMETER SETTING FOR USE IN DETERMINING ABNORMALITIES IN SCAN IMAGE

(71) Applicant: Konica Minolta, Inc., Chiyoda-ku, Tokyo (JP)

(72) Inventor: Makoto Oki, Hino (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/457,065

(22) Filed: Mar. 13, 2017

(65) Prior Publication Data
US 2017/0295293 A1 Oct. 12, 2017

(30) Foreign Application Priority Data
Apr. 12, 2016 (JP) .................................. 2016-079372

(51) Int. Cl.
*H04N 1/32* (2006.01)
*H04N 1/00* (2006.01)

(52) U.S. Cl.
CPC ..... *H04N 1/32683* (2013.01); *H04N 1/00005* (2013.01); *H04N 1/0009* (2013.01);
(Continued)

(58) Field of Classification Search
None
See application file for complete search history.

(56) References Cited

U.S. PATENT DOCUMENTS

2005/0281596 A1* 12/2005 Nakagawa ......... G03G 15/0131
399/350
2006/0126099 A1* 6/2006 Nakagawa ........... G06K 15/002
358/1.14
(Continued)

FOREIGN PATENT DOCUMENTS

JP 2000 029 198 1/2000
JP 2006-192884 A 7/2006
(Continued)

OTHER PUBLICATIONS

Extended European Search Report in EP application No. 17161784.8 dated Aug. 7, 2017, 9 pages.

*Primary Examiner* — Andrew H Lam
(74) *Attorney, Agent, or Firm* — Squire Patton Boggs (US) LLP

(57) ABSTRACT

An image forming system includes: an image forming apparatus including an image forming unit for forming an image on a sheet, an image reading unit for reading a sheet surface and generating a scan image, an image inspection unit for detecting abnormalities within the scan image, and a history generating unit for generating detection information of each of the abnormalities and generating a history image by embedding the detection information in the scan image; a storage device for storing the history image; and a user terminal for displaying an abnormality detection result and inputting a user's evaluation of the abnormality detection result, wherein the image forming apparatus further includes a parameter setting unit for finally determining the abnormalities depending on the user's evaluation, and determining and setting abnormality detection parameters such that the abnormalities finally determined are detected, and the abnormalities not finally determined are not detected.

19 Claims, 11 Drawing Sheets

(52) U.S. Cl.
CPC ..... *H04N 1/00037* (2013.01); *H04N 1/00058* (2013.01); *H04N 1/32315* (2013.01); *H04N 1/32336* (2013.01); *H04N 2201/0081* (2013.01); *H04N 2201/0082* (2013.01); *H04N 2201/0098* (2013.01); *H04N 2201/3277* (2013.01); *H04N 2201/3284* (2013.01)

(56) References Cited

U.S. PATENT DOCUMENTS

| | | |
|---|---|---|
| 2007/0127934 A1 | 6/2007 | Shoji et al. |
| 2012/0013935 A1 | 1/2012 | Adachi |
| 2013/0016382 A1 | 1/2013 | Kitajima |

FOREIGN PATENT DOCUMENTS

| | | |
|---|---|---|
| JP | 2015-085587 A | 5/2015 |
| JP | 2015-090554 | 5/2015 |

* cited by examiner

FIG. 10

| PARAMETER No. | TYPE OF SHEET | REQUESTER | EVALUATOR |
|---|---|---|---|
| 1 | GLOSSY SHEET | A | B |
| 2 | FINE QUALITY SHEET | C | B |
| 3 | ... | ... | ... |
| ⋮ | ⋮ | ⋮ | ⋮ |

FIG. 11

| JOB NAME | PAGE | ABNORMAL/ NORMAL | NAME OF ABNORMALITY | LEVEL OF ABNORMALITY |
|---|---|---|---|---|
| jobName2015026 | 1 | NORMAL | — | — |
| | 2 | NORMAL | — | — |
| | 3 | NORMAL | — | — |
| | 4 | ABNORMAL | dotE001 | 4 |
| | | | dotE002 | 2 |
| | ... | ... | ... | ... |
| | 11 | ABNORMAL | lineE001 | 2 |
| | ... | ... | ... | ... |
| ⋮ | ⋮ | ⋮ | ⋮ | ⋮ |

IMAGE FORMING SYSTEM, IMAGE FORMING APPARATUS AND PROGRAM WITH PARAMETER SETTING FOR USE IN DETERMINING ABNORMALITIES IN SCAN IMAGE

The entire disclosure of Japanese Patent Application No. 2016-079372 filed on Apr. 12, 2016 including description, claims, drawings, and abstract are incorporated herein by reference in its entirety.

BACKGROUND OF THE INVENTION

Field of the Invention

The present invention relates to an image forming system, an image forming apparatus and a program.

Description of the Related Art

Conventionally, it has been performed that an image is formed on a sheet by an image forming apparatus, and then a scan image obtained by reading the sheet surface is compared with an inspected normal image, whereby abnormalities are detected such as a stain, a color shift, and a position shift.

When the abnormalities are detected, a difference between the scan image and the normal image is displayed, whereby a user can confirm an image area in which the abnormalities are detected (for example, see JP 2000-29198 A).

Since an acceptable range of abnormalities that can be accepted by a user changes depending on an object of the image formation, normally, multiple abnormality detection parameters are prepared, whereby the user can select a detection level.

However, an algorithm for detecting the abnormalities is complicated, and it has been necessary to repeat detection parameter setting many times while confirming the actual abnormality detection result in order to perform optimization to the detection parameters according to the user's needs, and it has taken time and effort.

SUMMARY OF THE INVENTION

An object of the present invention is to facilitate setting of detection parameters according to the user's needs.

To achieve the abovementioned object, according to an aspect, an image forming system reflecting one aspect of the present invention comprises:
an image forming apparatus including
an image forming unit for forming an image on a sheet,
an image reading unit for reading a sheet surface on which the image is formed and generating a scan image,
an image inspection unit for detecting abnormalities within the scan image, and
a history generating unit for generating detection information of each of the abnormalities detected by the image inspection unit and generating a history image by embedding the detection information in the scan image;
a storage device for storing the history image; and
a user terminal for displaying an abnormality detection result by the image inspection unit by using the history image and inputting a user's evaluation of the abnormality detection result, wherein the image forming apparatus further includes a parameter setting unit for finally determining the abnormalities within the scan image depending on the user's evaluation input in the user terminal, and determining and setting abnormality detection parameters to be used in the image inspection unit such that the abnormalities finally determined are detected, and the abnormalities not finally determined are not detected.

According to an invention of Item. 2, there is provided the image forming system of Item. 1, wherein
the user terminal preferably displays the scan image and abnormality detection information within the history image as the abnormality detection result, and inputs a user's evaluation of whether or not each of the abnormalities within the scan image is an abnormality to be detected.

According to an invention of Item. 3, there is provided the image forming system of Item. 1, wherein
the user terminal preferably deletes, adds, or changes the abnormality detection information within the history image depending on the user's evaluation, and generates a modified history image, and
the parameter setting unit preferably finally determines the abnormalities within the scan image, based on the abnormality detection information within the modified history image.

According to an invention of Item. 4, there is provided the image forming system of Item. 3, wherein
the parameter setting unit preferably stores the scan image within the modified history image as an image for learning in the storage device when new detection information of abnormalities is added in the modified history image.

According to an invention of Item. 5, there is provided the image forming system of Item. 3, wherein
the user terminal preferably further inputs a reason for the user's evaluation, embeds the input reason for evaluation in the scan image, and generates the modified history image.

According to an invention of Item. 6, there is provided the image forming system of Item. 1, wherein
the parameter setting unit preferably individually determines each of the detection parameters when the image inspection unit switches the abnormality detection parameters to be used depending on a type of an abnormality to be detected, or for each partial image area.

According to an invention of Item. 7, there is provided the image forming system of Item. 6, wherein
the partial image area is preferably an image area having an identical image attribute.

According to an invention of Item. 8, there is provided the image forming system of Item. 1, wherein
the parameter setting unit preferably stores the abnormality detection parameters determined in the storage device in association with at least one of a type of a sheet used for formation of the image, a requester for formation of the image, and an evaluator of the abnormality detection result.

According to an invention of Item. 9, there is provided the image forming system of Item. 1, wherein
the parameter setting unit preferably creates a list of either or both of a page in which the abnormalities finally determined are detected and a page in which the abnormalities finally determined are not detected, and the user terminal preferably displays the list.

According to an invention of Item. 10, there is provided the image forming system of Item. 1, wherein
the parameter setting unit preferably notifies a user of contradiction when the user's evaluation of the abnormality detection result includes the contradiction.

According to an invention of Item. 11, there is provided the image forming system of Item. 1, wherein
the parameter setting unit preferably determines the abnormality detection parameters such that abnormalities evaluated as abnormalities not to be detected by the user are also detected when the user's evaluation of the abnormality detection result includes the contradiction.

According to an invention of Item. 12, there is provided the image forming system of Item. 1, wherein,
during initialization of the abnormality detection parameters,
the image inspection unit preferably detects all abnormalities that can be detected from the scan image by using a detection parameter with which the abnormalities are most easily detected of the multiple detection parameters that can be used, and
the parameter setting unit preferably determines and initializes the abnormality detection parameters such that abnormalities evaluated as abnormalities to be detected by the user are detected, and the abnormalities evaluated as abnormalities not to be detected are not detected, of all the abnormalities detected by the image inspection unit.

According to an invention of Item. 13, there is provided the image forming system of Item. 12, wherein
the image inspection unit preferably further detects abnormalities from the scan image by using detection parameters currently set, and
the user terminal preferably displays abnormality detection results by respective ones of the detection parameter with which the abnormalities are most easily detected and the detection parameter currently set.

According to an invention of Item. 14, there is provided the image forming system of Item. 1, wherein,
during initialization of the abnormality detection parameters,
the image forming unit preferably forms on the sheet sample images of different levels of abnormalities that can be detected by using a detection parameter with which the abnormalities are most easily detected of the multiple detection parameters that can be used by the image inspection unit, and
the parameter setting unit preferably determines and initializes the abnormality detection parameters such that the abnormalities evaluated as abnormalities to be detected by the user are detected, and the abnormalities evaluated as abnormalities not to be detected are not detected, of the abnormalities of the sample images.

According to an invention of Item. 15, there is provided the image forming system of Item. 1, wherein
a file format of the history image is preferably PDF, and the abnormality detection information is preferably embedded by using at least one of a bookmark, a note annotation, and a text annotation of the PDF.

To achieve the abovementioned object, according to an aspect, an image forming apparatus reflecting one aspect of the present invention comprises:
an image forming unit for forming an image on a sheet;
an image reading unit for reading a sheet surface on which the image is formed and generating a scan image;
an image inspection unit for detecting abnormalities within the scan image;
a history generating unit for generating detection information of each of the abnormalities detected by the image inspection unit and generating a history image by embedding the detection information in the scan image; and
a parameter setting unit for finally determining the abnormalities within the scan image depending on user's evaluation of an abnormality detection result by the image inspection unit, and determining and setting abnormality detection parameters to be used in the image inspection unit such that the abnormalities finally determined are detected, and the abnormalities not finally determined are not detected.

According to an invention of Item. 17, there is provided the image forming apparatus of Item. 16, wherein
the parameter setting unit preferably stores the set abnormality detection parameters in an external storage device.

According to an invention of Item. 18, there is provided the image forming apparatus of Item. 16, wherein
the parameter setting unit preferably acquires the abnormality detection parameters set depending on user's evaluation in another image forming apparatus, and sets the parameters as abnormality detection parameters to be used in the image inspection unit.

To achieve the abovementioned object, according to an aspect, a non-transitory recording medium storing a computer readable program reflecting one aspect of the present invention causes a computer to execute:
forming an image on a sheet by an image forming unit;
reading a sheet surface on which the image is formed by an image inspection unit and generating a scan image;
detecting abnormalities within the scan image by the image inspection unit;
generating detection information of each of the abnormalities detected by the image inspection unit and generating a history image by embedding the detection information in the scan image by a history generating unit; and
finally determining the abnormalities within the scan image depending on user's evaluation of an abnormality detection result by the image inspection unit, and determining and setting abnormality detection parameters to be used in the image inspection unit such that the abnormalities finally determined are detected, and the abnormalities not finally determined are not detected, by a parameter setting unit.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 10 is a table illustrating an example of a list of the abnormality detection parameters;

FIG. 11 is a table illustrating an example of a list of pages in which the abnormalities finally determined are detected and pages in which the abnormalities are not detected.

DESCRIPTION OF THE PREFERRED EMBODIMENTS

Hereinafter, an embodiment of an image forming system, an image forming apparatus and a program of the present invention will be described with reference to the drawings. However, the scope of the invention is not limited to the illustrated examples.

[Image Forming System]

Figure 1:
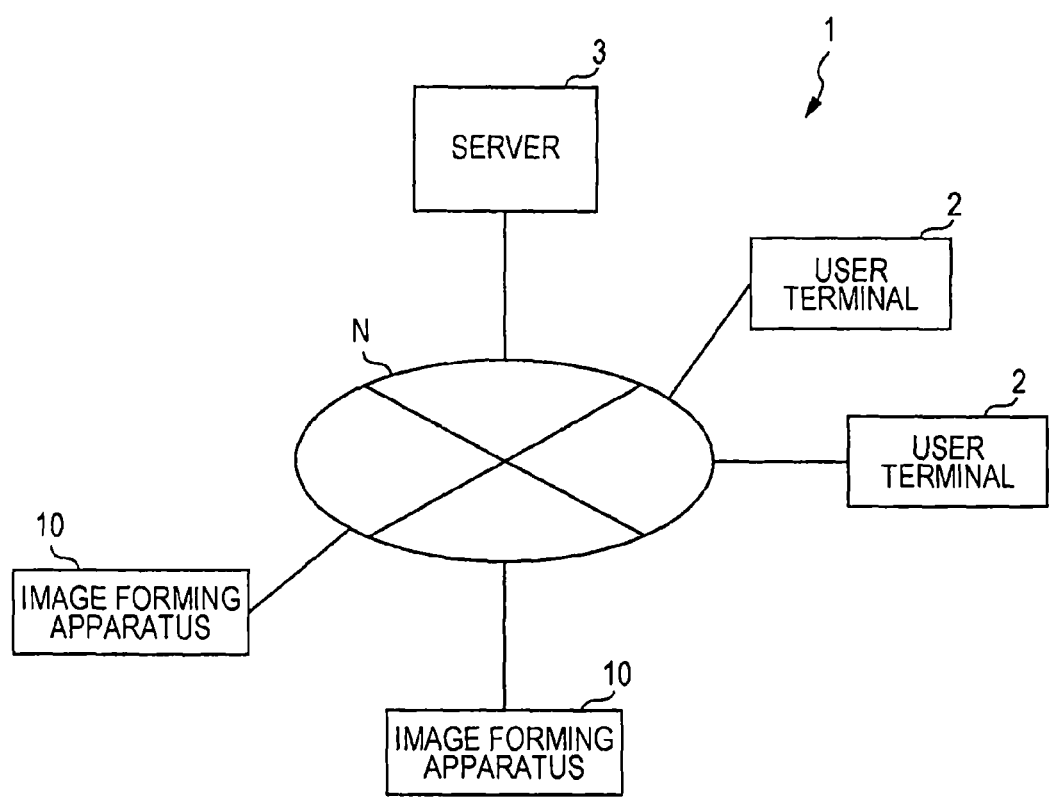
FIG. 1 is a diagram illustrating a configuration of an image forming system of an embodiment of the present invention.

FIG. 1 illustrates an image forming system 1 of the embodiment of the present invention.

As illustrated in FIG. 1, the image forming system 1 includes an image forming apparatus 10, a user terminal 2, and a server 3 that are connected to each other via a network N.

In the image forming system 1, vector data in which contents of an image to be formed is described with a page description language (PDL) is transmitted to the image forming apparatus 10 via the server 3 from the user terminal 2, whereby the image can be formed on a sheet in the image forming apparatus 10.

Incidentally, FIG. 1 illustrates two image forming apparatuses 10 and two user terminals 2; however, the numbers of the image forming apparatuses 10, the user terminals 2, and the like are not particularly limited.

[Image Forming Apparatus]

Figure 2:
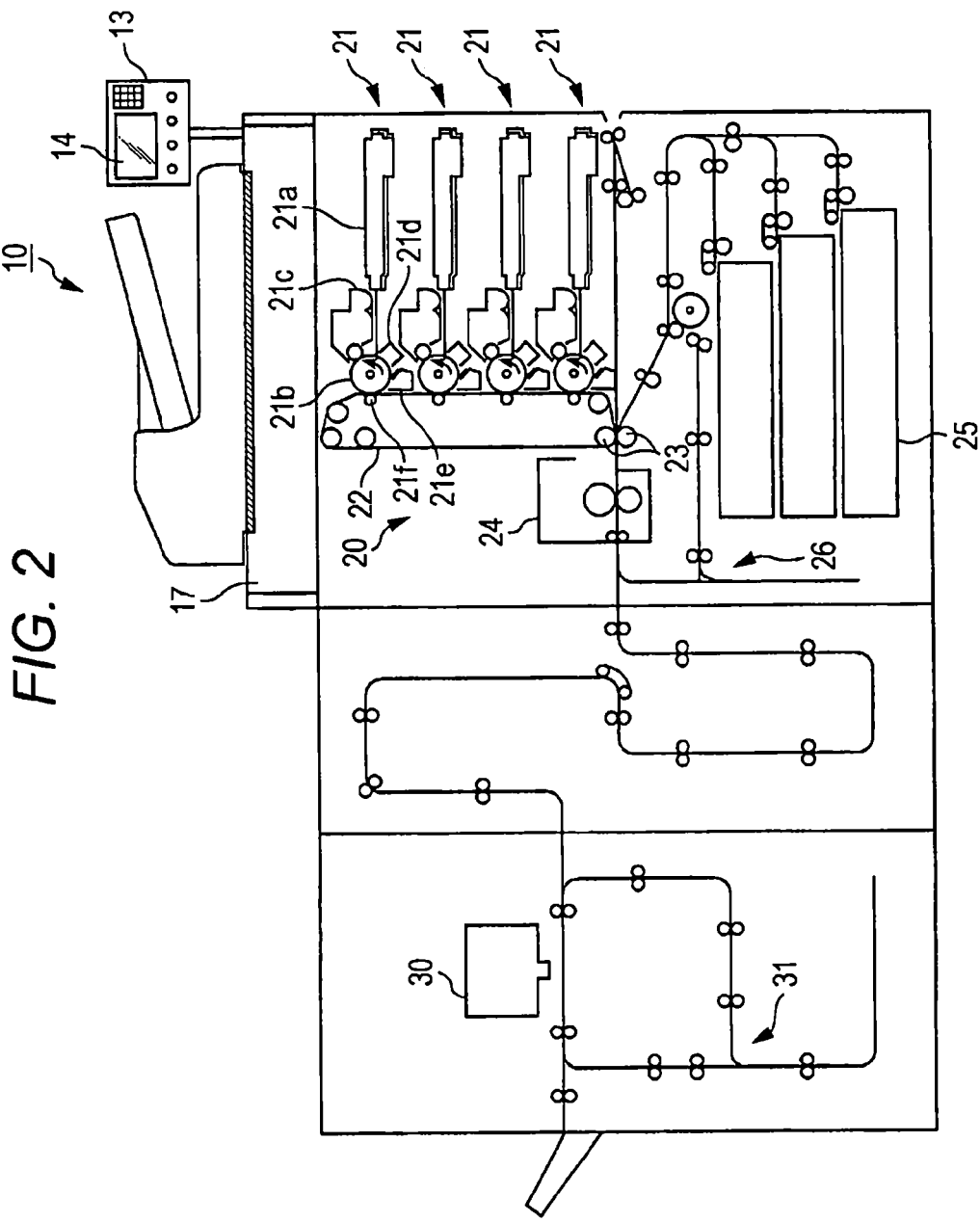
FIG. 2 is a front view illustrating a schematic configuration of an image forming apparatus.

FIG. 2 illustrates a schematic configuration of the image forming apparatus 10.

As illustrated in FIG. 2, the image forming apparatus 10 includes an image forming unit 20 for forming an image on a sheet, and an image reading unit 30 for reading the sheet surface and generating a scan image.

Figure 3:
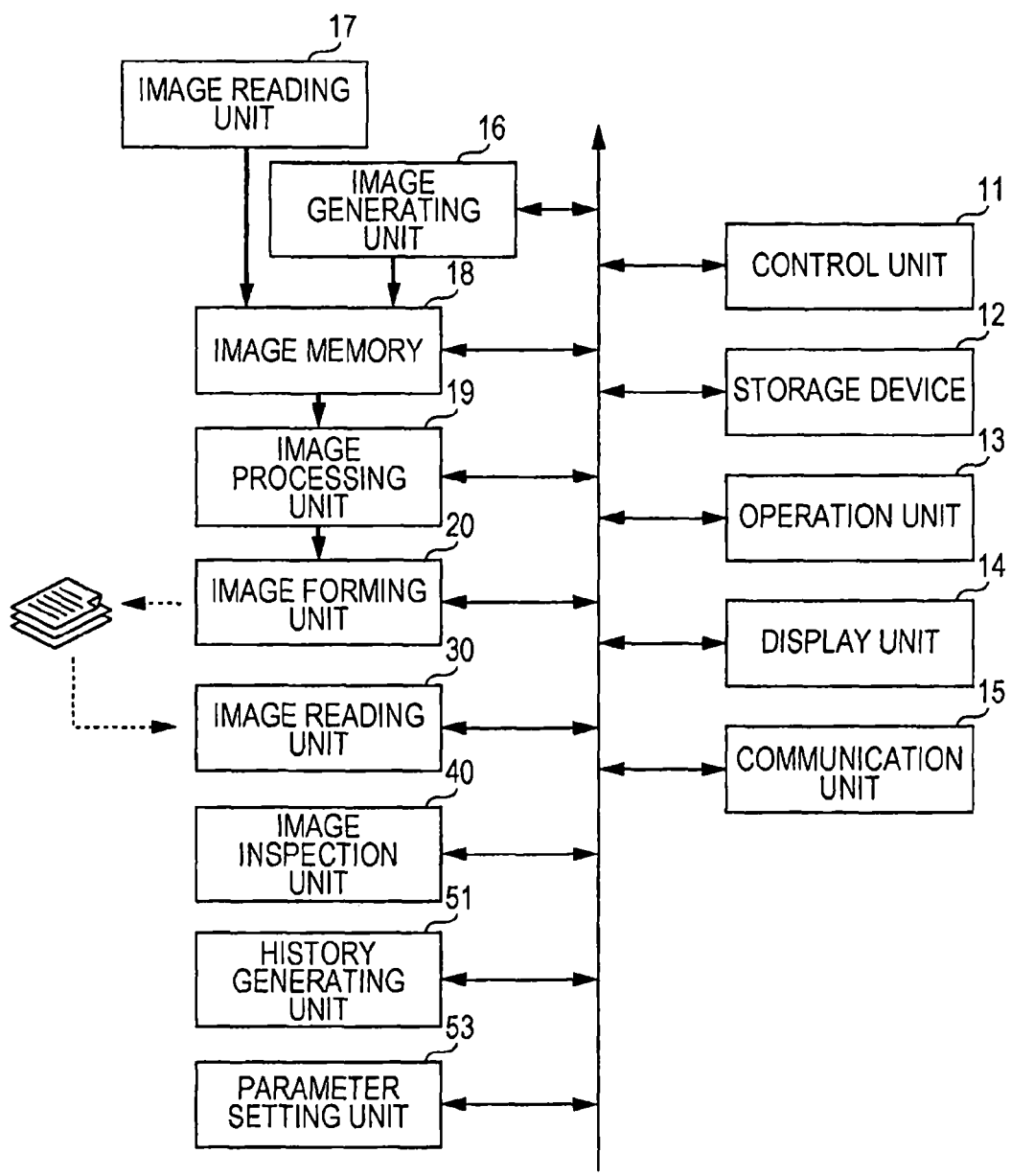
FIG. 3 is a block diagram illustrating a configuration of the image forming apparatus for each function.

FIG. 3 is a block diagram illustrating a main configuration of the image forming apparatus 10 for each function.

As illustrated in FIG. 3, the image forming apparatus 10 includes a control unit 11, a storage device 12, an operation unit 13, a display unit 14, a communication unit 15, an image generating unit 16, an image reading unit 17, an image memory 18, an image processing unit 19, an image forming unit 20, the image reading unit 30, an image inspection unit 40, a history generating unit 51, and a parameter setting unit 53.

The control unit 11 is configured to include a central processing unit (CPU) and random access memory (RAM), and controls each unit by reading and executing various programs from the storage device 12.

For example, the control unit 11 causes the image processing unit 19 to perform image processing to an original image in bitmap format that is generated by the image generating unit 16 or the image reading unit 17 and held in the image memory 18, and causes the image forming unit 20 to form a document image on the sheet on the basis of the original image after the image processing.

The storage device 12 stores programs that can be read by the control unit 11, files to be used during execution of the programs, and the like. As for the storage device 12, a large capacity memory can be used such as a hard disk.

The operation unit 13 generates an operation signal depending on user's operation, and outputs the signal to the control unit 11. As for the operation unit 13, a touch panel configured integrally with a key pad and the display unit 14, and the like can be used.

The display unit 14 displays an operation screen and the like in accordance with an instruction of the control unit 11. As for the display unit 14, a liquid crystal display (LCD), an organic electro luminescence display (OELD), and the like can be used.

The communication unit 15 communicates with external devices on the network N, for example, the user terminal 2, the server 3, and another image forming apparatus 10.

For example, the communication unit 15 receives the vector data described above via the network N from the user terminal 2. In addition, the communication unit 15 transmits the history image generated by the history generating unit 51 to the user terminal 2, and receives the history image modified in the user terminal 2.

The image generating unit 16 performs rasterization processing to the vector data receive by the communication unit 15, and generates the original image in bitmap format. In the original image, each pixel has pixel value of four colors of cyan (C), magenta (M), yellow (Y), and black (K). Each of the pixel values is a data value representing light and shade of the image, and, for example, an 8 bit data value represents light and shade of 0 to 255 gradation.

The image generating unit 16 generates attribute information representing the attribute of each pixel, during the generation of the original image.

For example, the image generating unit 16 determines the attribute of each pixel of an image such as a Japanese syllable, alphabet, or number drawn in accordance with a character code described in PDL, as Text, and determines the attribute of each pixel of an image such as a ruled line, polygon, or circle drawn in accordance with vector format description such as DXF, SVG, or WMF, as Graphics. In addition, the image generating unit 16 determines the attribute of an image such as a photograph drawn with a file of JPEG or the like, as Photo, and further determines the attribute of an image that can be recognized as a face by performing face recognition, as face.

The image reading unit 17 includes an automatic document feeder and a scanner as illustrated in FIG. 2, and reads a document surface set on a document table, and generates the original image in bitmap format. In the original image generated by the image reading unit 17, each pixel has pixel values of three colors of red (R), green (G), and blue (B). The original image is subjected to color conversion into the original image having pixel values of four colors of C, M, Y, and K, by a color conversion unit not illustrated.

The image memory 18 is a buffer memory for temporary holding the original image generated by the image generating unit 16 or the image reading unit 17. As for the image memory 18, dynamic RAM (DRAM) and the like can be used.

The image processing unit 19 reads the original image from the image memory 18, and performs various types of image processing, such as image rotation, enlargement, and reduction, page number addition, layout processing such as page aggregation, thinning processing, gray level correction processing, and halftone processing for artificially reproducing halftone.

The image forming unit 20 forms the document image composed of four colors of C, M, Y, and K on the sheet depending on the pixel values of four colors of each pixel of the original image subjected to the image processing by the image processing unit 19.

The image forming unit 20 includes four writing units 21, an intermediate transfer belt 22, a secondary transfer roller 23, a fixing device 24, and a sheet feeding tray 25, as illustrated in FIG. 2.

The four writing units 21 are arranged in series (tandem) along a belt surface of the intermediate transfer belt 22, and form the images of colors of C, M, Y, and K, respectively. Each of the writing units 21 has the same configuration except that color of the image to be formed is different from others', and includes an optical scanning device 21a, a photoreceptor 21b, a developing unit 21c, a charging unit 21d, a cleaning unit 21e, and a primary transfer roller 21f, as illustrated in FIG. 2.

During the image formation, in each of the writing units 21, the photoreceptor 21b is charged by the charging unit 21d, and then light flux emitted by the optical scanning device 21a scans the photoreceptor 21b on the basis of the document image, and an electrostatic latent image is formed. When color material such as toner is supplied and developed by the developing unit 21c, the image is formed on the photoreceptor 21b.

The images respectively formed on the photoreceptors 21b of the four writing units 21 are sequentially transferred onto the intermediate transfer belt 22 by the respective primary transfer rollers 21f to be superimposed on each other (primary transfer). Thus, the image composed of each color is formed on the intermediate transfer belt 22. After the primary transfer, the color material remaining on the photoreceptor 21b is removed by the cleaning unit 21e.

The image forming unit 20 feeds the sheet from the sheet feeding tray 25, and transfers the image onto the sheet from the intermediate transfer belt 22 by the secondary transfer roller 23 (secondary transfer), and then performs fixing processing by heating and pressing the sheet with the fixing device 24.

When the image is formed on both sides of the sheet, the sheet is conveyed to a conveying path 26 and the front and back of the sheet is reversed, and then the sheet is conveyed to the secondary transfer roller 23 again.

The image reading unit 30 reads the sheet surface on which the image is formed in the image forming unit 20, and generates the scan image in bitmap format. One surface of the sheet is read by the image reading unit 30, and then the sheet is conveyed to the image reading unit 30 via a conveying path 31, whereby both sides of the sheet can be read.

As for the image reading unit 30, a line sensor or an area sensor using an imaging device such as a charge coupled device (CCD) can be used.

The image inspection unit 40 detects abnormalities within the scan image by comparing the scan image generated by the image reading unit 30 with a normal image. As for the normal image, the original image can be used generated by the image generating unit 16 or the image reading unit 17, and the scan image can also be used of a sheet that is inspected by the user among multiple pages of sheets each having an image, and determined as having no abnormalities.

The image inspection unit 40 is capable of detecting multiple types of abnormalities, such as a defect of the image, a color shift, and a position shift, and the image inspection unit 40 detects at least one type of multiple types of the abnormalities by using an abnormality detection algorithm corresponding to a type of an abnormality to be detected. The image inspection unit 40 is capable of switching ease of abnormality detection, that is, a detection level by changing abnormality detection parameters for determining whether the image is abnormal or normal in each detection algorithm.

For example, during detection of the defect, the image inspection unit 40 determines feature points of the scan image and the normal image, and calculates feature values of the feature points and discriminates whether or not the feature values are similar to each other with a discriminant analysis method, and detects a feature point discriminated that the compared points are not similar to each other, as an image area in which the defect has occurred such as a stripe, a wrinkle, a stain, an image error, or disappearance. A detection parameter in this detection algorithm is a linear discrimination function to be used for discriminant analysis, and the like, and the detection level of the defect can be switched by changing the detection parameter.

During detection of a color shift, the image inspection unit 40 detects an image area in which a gradation value difference between the scan image and the normal image is equal to or greater than a threshold as an image area in which the color shift has occurred. A detection parameter in this detection algorithm is the threshold to be compared with the gradation value difference between the scan image and the normal image, and the detection level of the color shift can be changed, such that the color shift is easily detected when the threshold is small, and the color shift is less easily detected when the threshold is large.

The image inspection unit 40 uses the gradation value of the normal image as a reference value, and calculates a difference between the gradation value of the scan image and the reference value as an amount of the color shift. When an image for color shift detection is formed for calibration, it is also possible to detect the color shift within its scan image. As for the image for color shift detection, the image can be used such as a color chart composed of multiple patches respectively having different gradation values of, for example, primary colors (C, M, Y, and K) and secondary colors (mixtures of primary colors).

During detection of a position shift, the image inspection unit 40 detects an image area in which an amount of position shift between the normal image and the scan image is equal to or greater than a threshold as an image area in which the position shift has occurred. A detection parameter in this detection algorithm is the threshold to be compared with the amount of position shift, and the detection level of the position shift can be changed, such that the position shift is easily detected when the threshold is small, and the position shift is less easily detected when the threshold is large.

When an image for position shift detection is formed for position shift correction, it is also possible to detect the position shift of the image. As for the image for position shift detection, for example, an image of a cross called a register mark can be used. The image inspection unit 40 compares positions with each other, for example, distances from the sheet edge to the register mark of the image, of the images for position shift detection of the normal image and the scan image, and detects an image area in which the positions of the register marks differ as an image area in which the position shift has occurred. The image inspection unit 40 calculates a position difference of the image for position shift detection between the normal image and the scan image as the amount of position shift.

Incidentally, the detection algorithm and the detection parameter of each of the abnormalities described above are examples, and the detection algorithm and the detection parameter to be used by the image inspection unit 40 are not limited thereto.

The history generating unit 51 generates the history image by using the scan image generated by the image reading unit 30. The history image is evidence of implementation of the image formation, and can also be used for inspection and confirmation of printed matter obtained by the image formation.

When at least one of the abnormalities is detected by the image inspection unit 40, the history generating unit 51 generates detection information indicating that each of the abnormalities is detected, and generates the history image by embedding the generated detection information in the scan image. The history generating unit 51 stores the generated history image in the storage device 12; however the history image may be transmitted to the external device on the network N, such as the user terminal 2 or the server 3, via the communication unit 15, and stored in the storage device of the external device.

For the abnormality detection result by the image inspection unit 40, the parameter setting unit 53 finally determines the abnormalities within the scan image depending on a user's evaluation input in the user terminal 2, and determines and sets the abnormality detection parameters to be used in the image inspection unit 40 such that the abnormalities finally determined are detected, and the abnormalities not finally determined are not detected.

[User Terminal]

As for the user terminal 2, a general computer terminal such as a PC can be used.

Figure 4:
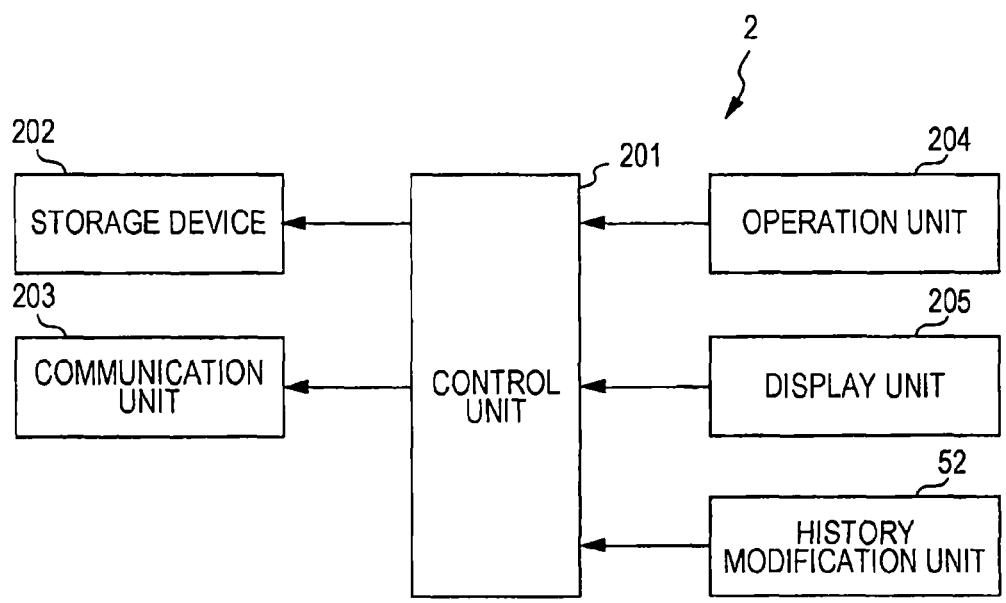
FIG. 4 is a block diagram illustrating a configuration of a user terminal for each function.

FIG. 4 is a block diagram illustrating a configuration of the user terminal 2 for each function.

As illustrated in FIG. 4, the user terminal 2 includes a control unit 201, a storage device 202, a communication unit 203, an operation unit 204, a display unit 205, and a history modification unit 52.

The control unit 201 is configured to include a CPU and RAM, and controls each unit by reading and executing various programs from the storage device 202.

The storage device 202 stores programs that can be read by the control unit 201, files to be used during execution of the programs, and the like. As for the storage device 202, a large capacity memory can be used such as a hard disk.

The storage device 202 is capable of storing the history image generated in the image forming apparatus 10, the determined detection parameters, and the like.

The communication unit 203 communicates with external devices on the network N such as the image forming apparatus 10, and the server 3.

The communication unit 203 is capable of transmitting, for example, the vector data to the server 3, and receiving the history image and the like from the image forming apparatus 10.

The operation unit 204 is capable of inputting the user's evaluation of the abnormality detection result within the scan image in the image forming apparatus 10. As for the operation unit 204, a keyboard, a touch panel, a key pad, and the like can be used.

The display unit 205 is capable of displaying the history image within the scan image generated in the image forming apparatus 10, abnormality detection information, and the like. As for the display unit 205, an LCD, an OELD, and the like can be used.

The history modification unit 52 deletes, adds, or changes the abnormality detection information within the history image depending on the user's evaluation input via the operation unit 204, and generates a modified history image.

[Server]

The server 3 manages formation of the image in each image forming apparatus 10 on the network N.

The server 3 can be configured similarly to the user terminal 2, and includes a control unit, a storage device, an operation unit, a display unit, and a communication unit.

For example, the server 3 delivers the vector data from each user terminal 2 to each image forming apparatus 10, and stores the abnormality detection parameters set depending on the user's evaluation in each image forming apparatus 10, in the storage device.

Incidentally, the image inspection unit 40, the history generating unit 51, the history modification unit 52, and the parameter setting unit 53 each can be configured by a dedicated hardware resource such as a large scale integration (LSI), and the processing contents same as the case of the hardware resource can also be achieved by software processing in which the program for inspection of the image or generation of the history image is read and executed by a computer such as a CPU.

In the image forming system 1, the abnormalities of the image formed on the sheet by the image forming apparatus 10 are detected, and the abnormality detection parameters are determined and set depending on the user's evaluation of the abnormality detection result, whereby the detection parameters according to the user's needs can be easily set.

Figure 5:
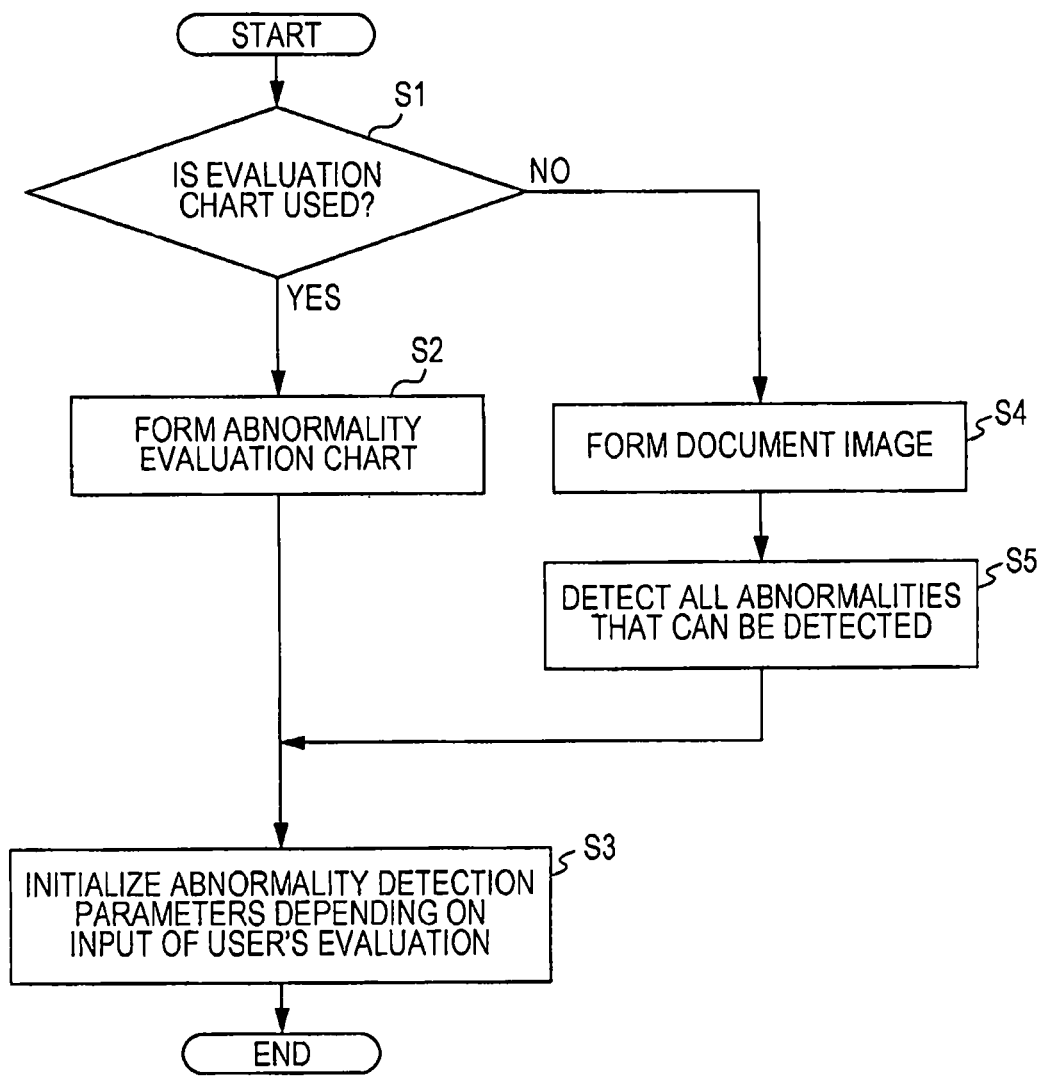
FIG. 5 is a flowchart illustrating a processing procedure for initializing abnormality detection parameters in the image forming apparatus.

FIG. 5 illustrates a processing procedure for initializing the abnormality detection parameters in the image forming apparatus 10.

Although a dedicated evaluation chart can be used for initialization, a document image of a job can also be used, and the user can select the one to be used.

As illustrated in FIG. 5, when use of the evaluation chart is selected by the user via the operation unit 13 (step S1: Y), the image forming unit 20 forms the abnormality evaluation chart on the sheet. As described above, since the abnormality detection algorithm differs depending on the type of the abnormality to be detected, an evaluation chart corresponding to the type of the abnormality is formed for the detection algorithm for initializing the detection parameters (step S2).

Figure 6:
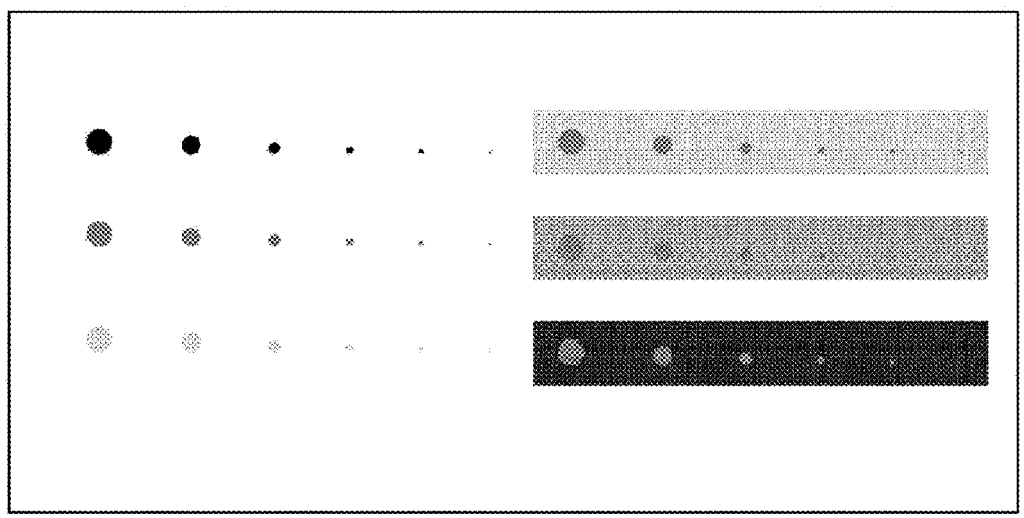
FIG. 6 is a diagram illustrating an example of an abnormality evaluation chart.

FIG. 6 illustrates a stain abnormality evaluation chart, as an example.

As illustrated in FIG. 6, in the evaluation chart, sample images of multiple stains are formed having different stain levels in stages. These sample images are sample images of the stains of all levels that can be detected by the image inspection unit 40, that is, sample images of the stains that can be detected by using a detection parameter with which the abnormalities are most easily detected of the multiple detection parameters that can be used by the image inspection unit 40. The stain is noticeable as the size, gray level, and contrast with the background increase.

The user observes the sample image of each of the abnormalities within the evaluation chart, and inputs via the operation unit 13 an evaluation for determining it as an abnormality to be detected when the abnormality of each sample image is an unacceptable abnormality, and an evaluation for determining it as an abnormality not to be detected, that is, normal, when the abnormality of each sample image is an acceptable abnormality.

When setting is initialized in a state in which the detection parameters are already set, it is preferable to display the image such as a mark indicating the sample image that can be detected with a currently set detection parameter, of the sample image of each of the abnormalities within the evaluation chart. Thus, the user is able to compare and evaluate the detection parameters.

In addition, it may be configured such that a cursor representing a boundary of the abnormality that can be detected by the detection parameter is displayed by the display unit 14 with the evaluation chart, and the cursor is operated via the operation unit 13 and is moved between the sample images of each of the abnormalities within the evaluation chart, and the abnormalities of the sample images are classified into the abnormality to be detected and the abnormality not to be detected, whereby the user's evaluation can be input.

When the user's evaluation is input via the operation unit 13, depending on the input evaluation, the parameter setting unit 53 determines and initializes the abnormality detection parameter to be used by the image inspection unit 40 (step S3). Specifically, the parameter setting unit 53 determines the abnormality detection parameters such that the abnormalities evaluated as abnormalities to be detected by the user are detected, and the abnormalities evaluated as abnormalities not to be detected are not detected, of the abnormalities of the sample images. For example, when the detection parameters are linear discrimination functions, the parameter setting unit 53 recalculates the linear discrimination functions so that the abnormalities of the sample image evaluated as the abnormalities to be detected and the abnormalities of the sample image evaluated as the abnormalities not to be detected are classified into respective different classes. Alternatively, a detection parameter that matches the user's evaluation may be selected of the multiple detection parameters that have different detection levels and can be used by the image inspection unit 40.

On the other hand, when use of the document image is selected (step S1: N), the image forming unit 20 forms the document image on the sheet (step S4). The image reading unit 30 reads the sheet surface and generates the scan image.

The image inspection unit 40 detects all the abnormalities that can be detected from the scan image by using a detection parameter with which the abnormalities are most easily detected of the multiple detection parameters that can be used (step S5).

The history generating unit 51 generates the abnormality detection information detected by the image inspection unit 40 and embeds the information in the scan image to generate the history image. The history image generate is transmitted to the user terminal 2 by the communication unit 15. In the user terminal 2 receiving the history image, the scan image and the abnormality detection information within the history image are displayed by the display unit 205, as an abnormality detection result. Then, the user's evaluation of the abnormality detection result input via the operation unit 204 is transmitted to the image forming apparatus 10 by the communication unit 203.

When setting initialization is performed in a state in which the detection parameters are already set, it is preferable that the image inspection unit 40 further detects the abnormalities from the scan image by using a currently set detection parameter, and displays abnormality detection results by respective ones of the detection parameter with which the abnormalities are most easily detected and the currently set detection parameter, in the user terminal 2. For example, the image may be displayed such as marks indicating the abnormalities that can be detected by the currently set detection parameter, of all the abnormalities detected by the detection parameter with which the abnormalities are most easily detected. Thus, the user is able to compare and evaluate the detection parameters.

During determination of the detection parameter, a detection parameter that matches the user's evaluation may be selected by increasing or decreasing the detection level by one or more stages from the currently set detection parameter.

After that, similarly to the case of the evaluation chart, the parameter setting unit 53 determines and initializes the abnormality detection parameters such that the abnormalities evaluated as abnormalities to be detected by the user are detected, and the abnormalities evaluated as abnormalities not to be detected are not detected, of all the abnormalities detected by the image inspection unit 40 (step S3).

Incidentally, an example has been described in which the abnormality detection result by the image inspection unit 40 is displayed and the user's evaluation of the abnormality detection result is input, in the image forming apparatus 10 in a case of the evaluation chart, and in the user terminal 2 in a case of the document image; however, the display and input can be performed in either the image forming apparatus 10 and the user terminal 2.

Figure 7:
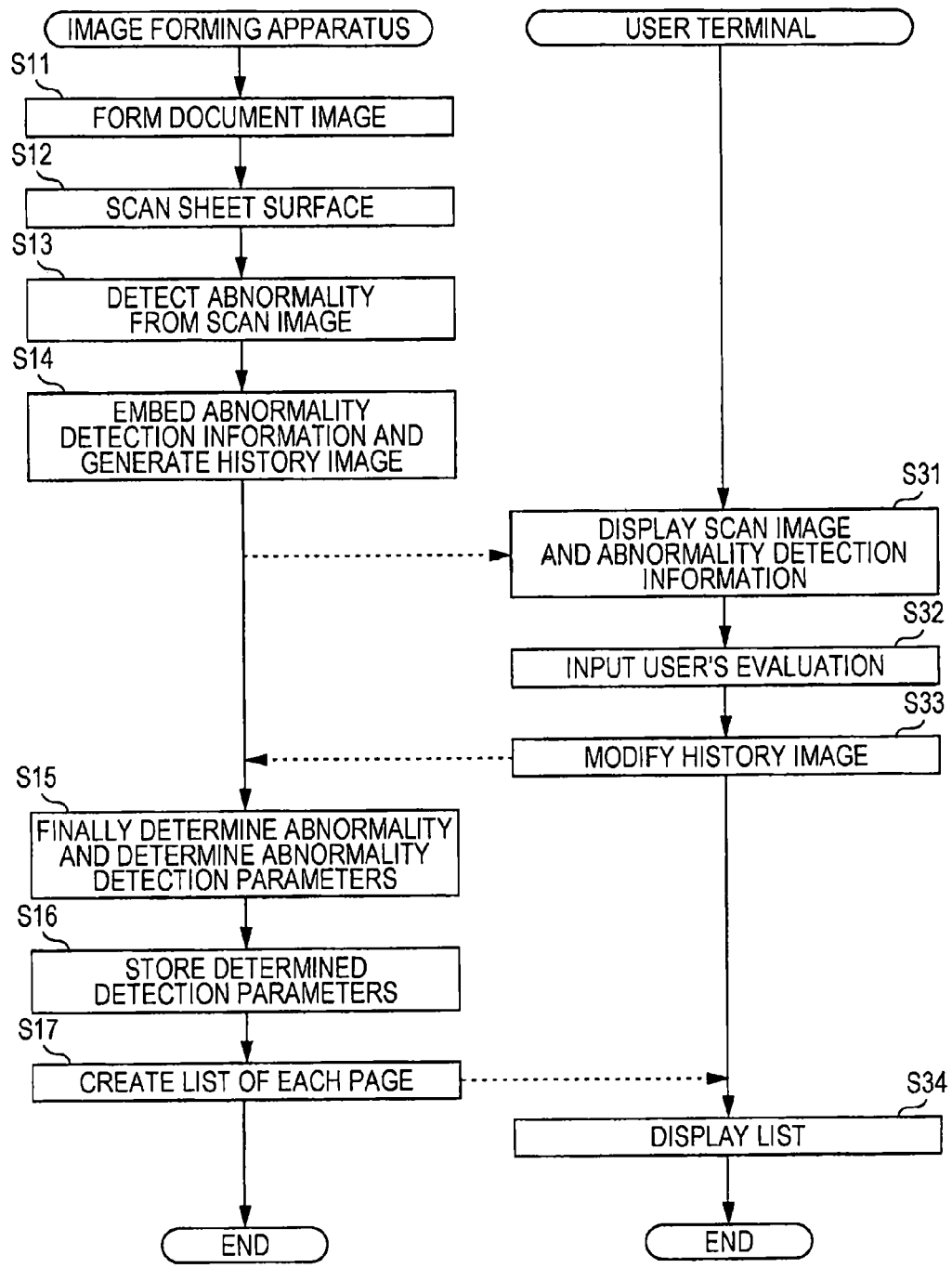
FIG. 7 is a flowchart illustrating a processing procedure for detecting abnormalities during execution of a job in the image forming system.

FIG. 7 illustrates a processing procedure for detecting abnormalities during execution of a job in the image forming apparatus 10.

As illustrated in FIG. 7, in the image forming system 1, when the vector data is transmitted from the user terminal 2, the image generating unit 16 executes vector data rasterization processing, and generates the original image in bitmap format for each page. In addition, the image generating unit 16 generates attribute information indicating the attribute of each pixel of the original image.

The image processing unit 19 performs image processing to the original image. The image processing includes gradation processing, and halftone processing. The image processing unit 19 is capable of acquiring the attribute information generated with the original image, and performing image processing of different conditions depending on the attribute, such that the number of screen lines is caused to differ for each attribute indicated by the attribute information.

The image forming unit 20 sequentially forms the document image on the sheet of each page in accordance with the original image of each page subjected to the image processing by the image processing unit 19 (step S11). The image reading unit 30 sequentially reads the sheet surface on which the document image is formed, and generates the scan image of each page (step S12).

The image inspection unit 40 detects the abnormalities within the scan image of each page generated by the image reading unit 30 (step S13).

The image inspection unit 40 is capable of switching to a detection algorithm corresponding to the type of the abnormality to be detected, and detecting the abnormality. For example, the image inspection unit 40 is capable of detecting a stain abnormality by using a stain detection algorithm, and then detecting a color shift abnormality by using a color shift detection algorithm.

In addition, the image inspection unit 40 is capable of using multiple detection parameters even in the same detection algorithm, and switching to a different abnormality detection parameter for each partial image area, and detecting the abnormality. For example, the image inspection unit 40 is capable of detecting the abnormality by using a detection parameter with which the abnormality is easily detected, for the central portion that is highly important, and detecting the abnormality by using a detection parameter with which the abnormality is less easily detected than that for the central portion, for the edge portion that is less important, within one page.

The partial image area may be an image area having the same image attribute. In this case, the image inspection unit 40 is capable of acquiring the attribute information of each page, and detecting the abnormality by using a detection parameter with which the abnormality is easily detected, for the image area indicating an attribute of a character having a large influence of the abnormality, and by using a detection parameter with which the abnormality is less easily detected than that for the character, for the image area indicating the attribute of a photograph, for the attribute information acquired, for example.

The history generating unit 51 generates the history image by using the scan image of each page. When an abnormality is detected by the image inspection unit 40, the history generating unit 51 embeds the abnormality detection information detected in each page in the scan image of each page, and then performs integration to generate the history image of one job (step S14).

Specifically, the history generating unit 51 converts the file format of the scan image to the file format of the history image. When the abnormality is detected, the history generating unit 51 generates text of the name of the abnormality as the detection information of the abnormality, and embeds the generated text in one or more rectangular areas including the image area in which the abnormality is detected in the scan image.

The file format of the history image is not particularly limited as far as it is a file format with which the abnormality detection information can be embedded and read, and, for example, a file format can be used that uses a structured language adding meta information by a tag, such as PDF, HTML, or OOXML.

Among them, PDF is preferable since it has high versatility. In a case of the PDF format, it is possible to embed the abnormality detection information by using at least one of the tools of a bookmark, note annotation, text annotation, and the like provided by the application for creating a PDF format file. The note annotation is a tool enabling addition of text to an arbitrary area within one page, and the text annotation is a tool enabling addition of a configuration instruction such as text replacement, addition, or paragraph change within one page. In addition, it is also possible to embed the abnormality detection information in the scan image by forming a layer structure in which the text of the abnormality detection information is made to be a background layer different from the scan image layer.

The name of the abnormality is preferably one of a type of the abnormality, an identification number, and a level, or a combination of two or more thereof, which makes it easy to search for text of the abnormality easy.

The identification number of the abnormality is, for example, a page number in which the abnormality is detected, or a number indicating order of detection within each page. The level of the abnormality is the amount of color shift, the amount of position shift, and the like calculated by the image inspection unit 40.

Further, it is preferable to combine together pieces of information with which the printed matter to be inspected can be identified, such as a serial number of the image forming apparatus performing the image formation, a name of the job of the image formation, and a file name of the original image, which makes it easier to search for the abnormality by using the history image.

For example, the text of the name of the abnormality of the defect "JobA_p4err001" can be generated by combining together each text of "JobA" indicating that the name of the job is A, "p4" indicating the page number in which the abnormality is detected, "err" indicating that the type of the abnormality is the defect, and "001" indicating that it is the first detection in one page.

In addition, when the type of the abnormality is the color shift, the text of the name of the abnormality of the color shift "dEerr002" can be generated in which the text "dEerr" indicating the color shift and the text of the number indicating the amount of color shift are combined together.

The history generating unit 51 is capable of determining one rectangular area circumscribing an image area in which a defect is detected, as an embedded area for text, and determining a format and layout of the text so that the size of the determined embedded area and the size of the text at the time of being embedded in the embedded area coincide with each other.

In addition, the history generating unit 51 is also capable of determining one or more rectangular areas superimposed on the image area in which the defect is detected, as embedded areas for text, and determining a format and layout of the text so that the size of each determined embedded area and the size of the text at the time of being embedded in each embedded area coincide with each other.

The history generating unit 51 is also capable of adjusting a character arrangement direction, angle, aspect ratio, and the like, as the format and layout of the text.

In addition, the embedded text preferably has transparent color, which makes it possible to confirm the scan image even when the embedded text is displayed during display of the scan image.

The history generating unit 51 is capable of extracting the image area in which the abnormality is detected, from the scan image, generating an image for clearly indicating the image area extracted as the detection information of the abnormality of the defect, and embedding the image generated in the scan image, as a different layer from the scan image layer. When at least the image area in which the abnormality is detected can be clearly indicated, an image for clearly indicating the rectangular area may be generated by extracting one or more rectangular areas including the image area in which the abnormality is detected, similarly to the embedded area for text.

The image for clearly indicating the image area in which the abnormality is detected can be at least one of an image in which the image area is emphasized more than other areas by hatching, brightness inversion, or the like, and an image in which the image area in which the abnormality is detected is superimposed on the normal image, and a position to be superimposed is positioned at a position of the image area at which the abnormality is detected in the scan image. Both are images in which the image area in which the abnormality is detected can be easily grasped.

Incidentally, in the case of superimposition to the normal image, when each of the normal image and the image of only the image area in which the abnormality is detected is embedded as a different layer in the scan image, it is possible to switch the images to display, and it is easier to grasp the abnormality.

The history generating unit 51 is also capable of generating a bookmark using the text of the name of each of the abnormalities as an index, and embedding the bookmark in the history image.

In the bookmark, the texts of the name of the abnormality can be described hierarchically for each type of the abnormality, and the text can describe a link destination to each page in which the text is embedded.

When no abnormality is detected, the bookmark indicating that the number of detection is zero may be generated and embedded in the scan image.

From the history image generated in this way, it is possible to easily search for the abnormality detected by the image inspection unit 40 by using the text of the abnormality detection information embedded in the history image. In particular, the PDF format history image is preferable, since applications enabling viewing of PDF format files typified by Acrobat (registered trademark) are widely used, and it is possible to easily perform searching by using the applications.

The communication unit 15 transmits the history image generated by the history generating unit 51 to the user terminal 2.

In the user terminal 2 receiving the history image, the control unit 201 analyzes the history image and acquires the scan image and the abnormality detection information from the history image, and displays them as an abnormality detection result with the display unit 205 (step S31).

Figure 8:
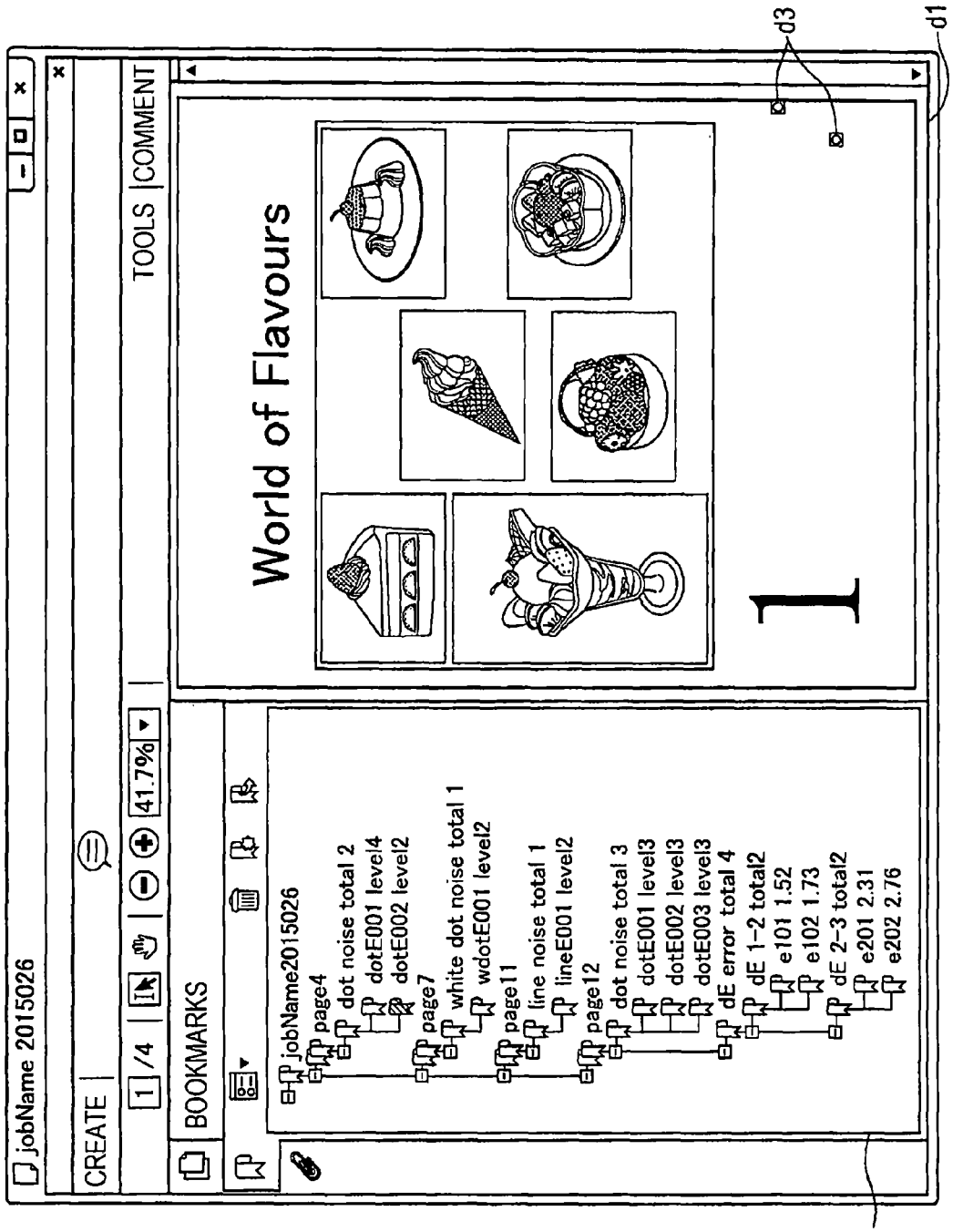
FIG. 8 is a diagram illustrating a display example of a scan image and abnormality detection information within the history image.

FIG. 8 illustrates a display example of the scan image and the abnormality detection information.

As illustrated in FIG. 8, a scan image d1 and a bookmark d2 are displayed on a display screen.

The scan image d1 can be displayed by being converted from PDF to a file format such as JPEG. In the image area in which the abnormality detection information is embedded within the scan image d1, a note annotation mark d3 is displayed.

In the bookmark d2, the texts of the names of the abnormalities detected in the pages of one job are hierarchically displayed as indexes of the respective abnormalities. For example, the index [page4]-[dot noise total 2]-[dotE0001 level 4] within the bookmark d2 indicates that two stain abnormalities are detected in the fourth page, and the name of the abnormality of one of them is dotE0001 and the stain level is four. With the bookmark d2, an overview can be grasped of the abnormality detection result, and it is possible to jump to a page in which each abnormality is detected from among multiple pages, and confirmation of the abnormality is easy.

The user can confirm the abnormalities within the scan image d1 with the note annotation mark d3 and the bookmark d2, and input an evaluation whether or not each of the abnormalities within the scan image d1 is an abnormality to be detected.

The evaluation can be input by, for example, operation for deleting the note annotation or the text annotation in which the detection information of the abnormality not to be detected is written, or operation for changing the abnormality detection information, such as adding the text denying the abnormality detection result within the note annotation or the text annotation, or rewriting the text representing the abnormality to the text representing normality. It may be configured such that an add-in function is added to software for file viewing, and the evaluation can be input by operation for selecting whether or not each of the abnormalities is the abnormality to be detected. In addition, when the user newly discovers the abnormality not detected by the image inspection unit 40, the evaluation for determining it as the abnormality to be detected can be input by operation for writing the text such as "NG" by using the note annotation or the text annotation and newly adding the abnormality detection information.

Figure 9:
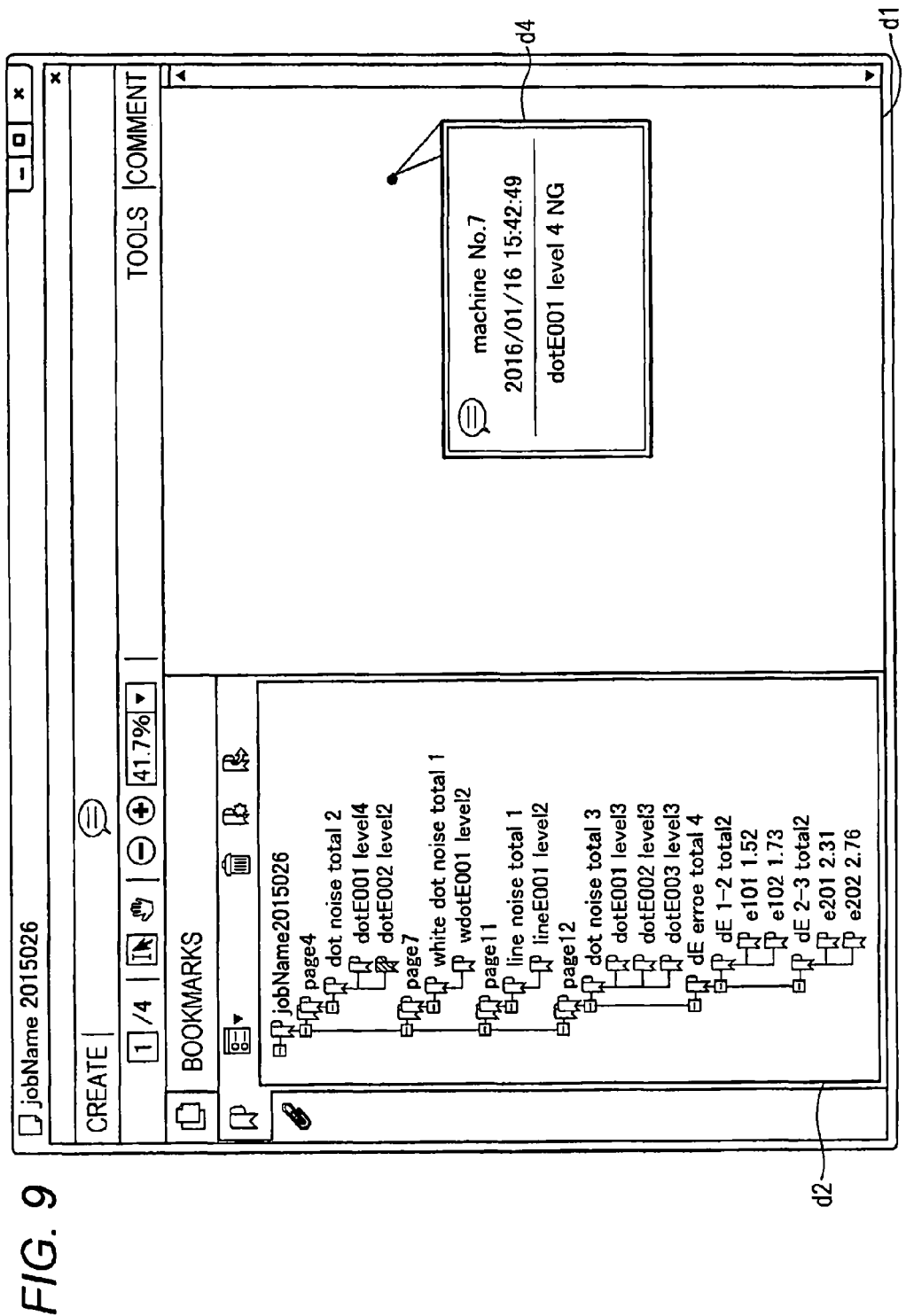
FIG. 9 is a diagram illustrating an input example of a user's evaluation.

FIG. 9 illustrates an example in which the user's evaluation is input by rewriting the note annotation.

As illustrated in FIG. 9, the text "dotE001 level 4 NG" of the abnormality detection information indicating that level 4 stain abnormality is detected is written in a note annotation d4; however, the evaluation for determining it as normal, not the abnormality to be detected, can be input by rewriting the text "NG" representing the abnormality to the text "OK."

When the user's evaluation of the abnormality detection result is input by the operation unit 204 (step S32), depending on this input, the history modification unit 52 deletes, adds, or changes the abnormality detection information embedded in the scan image, and generates a modified history image (step S33). After that, the modified history image is transmitted to the image forming apparatus 10 by the communication unit 203.

During input of the evaluation, it is preferable that a reason of the evaluation is input via the operation unit 204, and the history modification unit 52 embeds the input reason for the evaluation in the scan image, and generates the modified history image. For example, when the evaluation for determining it as an abnormality not to be detected is input, for the reason that the document image is an internal document and the abnormality is acceptable, the text representing the reason can be input, such as "for office, acceptable." The history modification unit 52 is capable of adding the text of the reason of the evaluation input via the operation unit 204 in the detection information of the abnormality to be evaluated, and generating the modified history image.

In this way, it is possible to confirm the criterion of the evaluation later, with the reason of the evaluation embedded in the history image.

In the image forming apparatus 10 receiving the history image after the modification from the user terminal 2, the parameter setting unit 53 finally determines the abnormalities within the scan image on the basis of the abnormality detection information embedded in the history image after the modification. Specifically, the parameter setting unit 53 excludes the abnormalities evaluated as abnormalities not to be detected, such as the abnormality in which the text "OK" is added in the detection information as an example described above, and finally determines the abnormalities evaluated as the abnormalities to be detected, as the abnormalities within the scan image, such as the abnormality in which there is no change in the detection information, and the abnormality in which the detection information is newly added.

The parameter setting unit 53 determines and sets the abnormality detection parameters to be used in the image inspection unit 40 such that the abnormalities finally determined are detected, and the abnormalities not finally determined are not detected (step S15). The abnormality detection parameters can be determined by recalculating the linear discrimination function, changing the magnitude of the threshold, and the like such that the abnormalities evaluated as the abnormalities to be detected and the abnormalities evaluated as the abnormalities not to be detected are classified into respective different classes, similarly to the case of initialization.

As described above, when the image inspection unit 40 switches the abnormality detection parameters to be used depending on the type of the abnormality to be detected, or for each partial image area, the parameter setting unit 53 individually determines each of the detection parameters. For example, when the image inspection unit 40 detects each of the stain and color shift abnormalities, the parameter setting unit 53 determines the stain detection parameter depending on the user's evaluation of the stain abnormality, and determines the color shift detection parameter depending on the user's evaluation of the color shift abnormality.

The user's evaluation of the abnormality detection result may include contradiction. For example, that is a case in which there is contradiction between the level of the abnormalities and the user's evaluation, such that the abnormalities having levels at which detection is easy, such as conspicuous stains, are evaluated as abnormalities not to be detected, and the abnormalities having levels at which detection is difficult, such as inconspicuous stains, are evaluated as abnormalities to be detected. In this case, the parameter setting unit 53 preferably notifies that there is contradiction, by causing the display unit 14 to display warning, or causing the communication unit 15 to transmit a warning message to the user terminal 2. Thus, re-evaluation can be prompted.

When the user's evaluation still includes contradiction, the parameter setting unit 53 preferably determines the abnormality detection parameters such that not only the abnormalities evaluated as abnormalities to be detected by the user but also the abnormalities evaluated as abnormalities not to be detected are detected. Thus, omission of abnormality detection due to erroneous evaluation can be prevented.

The parameter setting unit 53 stores the determined abnormality detection parameters in the storage device 12. In addition, the parameter setting unit 53 causes the communication unit 15 to transmit the determined abnormality detection parameters to the server 3, and store the parameters in the storage device of the server 3 (step S16). When the parameters can be stored in the storage device in the image forming system 1, the parameters may be stored in the storage device of the external device such as the user terminal 2, or the other image forming apparatus 10.

The parameter setting unit 53 preferably stores the determined abnormality detection parameters in association with at least one of a type of the sheet used for formation of the image, a requester for formation of the image, and an evaluator of the abnormality detection result.

Thus, it is possible to read and use the abnormality detection parameters previously determined, by using the type of the sheet, the requester for formation of the image, and the evaluator of the abnormality detection result as keywords. For example, although the abnormality detection result fluctuates depending on the unevenness, thickness, and the like of the sheet, the detection parameters corresponding to the type of the sheet can be easily reset by reading the detection parameters previously set by using the same type of the sheet. In addition, it is possible to detect the abnormalities with the same setting as the previous inspection by reading the detection parameters corresponding to the previous requester or evaluator. It is possible to compare the detection parameters of the respective evaluators, so that it is possible to prevent deviation depending on the evaluator.

FIG. 10 illustrates an example of a list of the abnormality detection parameters.

As illustrated in FIG. 10, in the list, pieces of information of the type of the sheet, the requester, and the evaluator are associated with a parameter No. that is identification information of each of the abnormality detection parameters. The list indicates that the detection parameter of No. 1 is used for inspection of the image formed on a glossy sheet, the requester is A, and the evaluator is B.

The parameter setting unit 53 creates a list of either or both of pages in which the abnormalities finally determined are detected and normal pages in which the abnormalities finally determined are not detected (step S17). When the list is transmitted to the user terminal 2 by the communication unit 15, and the list is displayed by the display unit 205 in the user terminal 2 (step S34), the processing is ended.

FIG. 11 illustrates an example of a list of each page.

As illustrated in FIG. 11, in the list, a job name is associated with whether the abnormalities finally determined are detected or not detected and are normal, the names of the abnormalities when the abnormalities are detected, the levels of the abnormalities, of each page formed by execution of the job. With the list, it is easy to grasp the inspection result of each page, such that the first-third pages are normal, and two stain abnormalities are detected in the fourth page, for example.

Incidentally, when new detection information of the abnormalities is added within the modified history image, the parameter setting unit 53 preferably stores the scan image within the history image as an image for learning in the storage device 12. When the image can be stored in the storage device in the image forming system 1, the image for learning may be stored in the storage device in the external device such as the user terminal 2, or the other image forming apparatus 10.

The stored image for learning can be used for designing detection algorithms and detection parameters with higher detection accuracy.

In this way, the abnormality detection parameters can be optimized in parallel with inspection of the document image, and when it is desired to detect the abnormalities with the same setting as the previous setting, it is also possible to read and use existing detection parameters stored.

Figure 12:
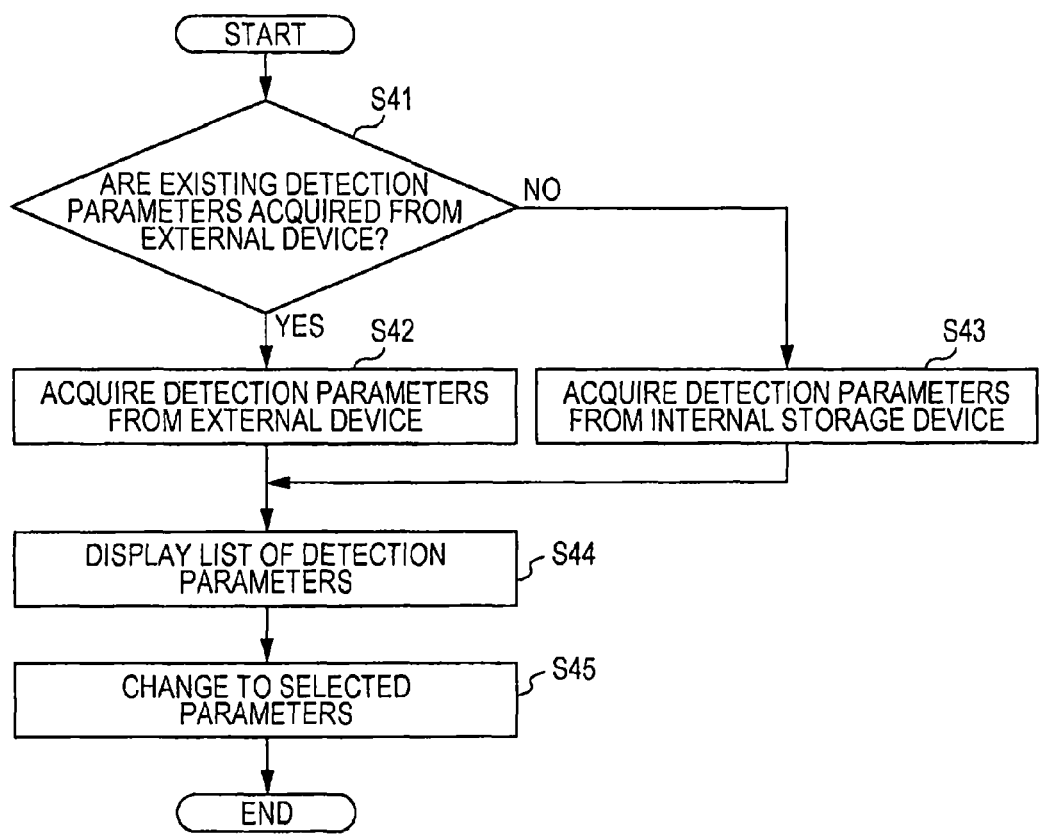
FIG. 12 is a flowchart illustrating a processing procedure for setting existing detection parameters in the image forming apparatus.

FIG. 12 illustrates a processing procedure for using existing detection parameters in the image forming apparatus 10.

As for the existing detection parameters, not only the detection parameters previously determined in the image forming apparatus 10, but also detection parameters determined in the other image forming apparatus 10 can be acquired. Since the detection parameters determined in the other image forming apparatus 10 are also stored in the storage device of the external device such as the server 3, the parameters may be acquired from the server 3 or the like.

As illustrated in FIG. 12, when the existing detection parameters determined depending on the user's evaluation in the other image forming apparatus 10 are acquired from the other image forming apparatus 10 or the server 3 and used (step S41: Y), the detection parameters stored in the storage device of the server 3 or the other image forming apparatus 10 are acquired via the communication unit 15 (step S42). On the other hand, when the detection parameters stored in the image forming apparatus 10 are used (step S41: N), the detection parameters are acquired from the storage device 12 inside the image forming apparatus 10 (step S43).

The list of the acquired detection parameters is displayed by the display unit 14 (step S44). At this time, it may be configured such that it is possible to search for objective detection parameters by using the type of the abnormality to be detected, attribute of the image, type of the sheet, requester, evaluator, and the like as keywords.

When any of the detection parameters in the list is selected by the user via the operation unit 13, the parameter setting unit 53 changes a detection parameter in the image inspection unit 40 to the detection parameters selected by the user and sets the selected detection parameter (step S45).

As described above, the image forming system 1 of the present embodiment includes the image forming apparatus 10 and the user terminal 2. The image forming apparatus 10 includes: the image forming unit 20 for forming the image on the sheet; the image reading unit 30 for reading the sheet surface on which the image is formed and generating the scan image; the image inspection unit 40 for detecting the abnormalities within the scan image; the history generating unit 51 for generating the detection information of each of the abnormalities detected by the image inspection unit 40 and generating the history image by embedding the detection information in the scan image; the storage device 12 for storing the history image; and the parameter setting unit 53 for finally determining the abnormalities within the scan image depending on the user's evaluation input in the user terminal 2, and determining and setting the abnormality detection parameters to be used in the image inspection unit 40 such that the abnormalities finally determined are detected, and the abnormalities not finally determined are not detected. In addition, the user terminal 2 includes: the display unit 205 for displaying the abnormality detection result by the image inspection unit 40 by using the history image; and the operation unit 204 for inputting the user's evaluation of the abnormality detection result.

With the image forming system 1, it is possible to display the scan image and the abnormality detection information by using the history image generated for each image formation, and input the user's evaluation of the abnormality detection result, and confirmation of the abnormality detection result and input of the user's evaluation of the detection result are easy. Since the abnormalities within the scan image are finally determined depending on the input evaluation and then the detection parameters are determined, it is possible to facilitate setting of detection parameters according to the user's needs.

The above embodiment is a preferred example of the present invention, and the present invention is not limited thereto. The present invention can be appropriately modified without departing from the gist of the present invention.

For example, in the user terminal 2, the scan image and the abnormality detection information are displayed, and the user's evaluation of the abnormality detection result is input and the history image is modified; however, this processing procedure may be performed in the image forming apparatus 10.

In addition, as for the computer readable medium for the program for executing the processing procedure described above, a nonvolatile memory such as ROM, or a flash memory, and a portable recording medium such as CD-ROM can be applied. As for a medium for providing the program data via a communication line, a carrier wave can be applied.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image forming system comprising:
an image forming apparatus including
an image forming unit for forming an image on a sheet,
an image reading unit for reading a sheet surface on which the image is formed and generating a scan image,
an image inspection unit for detecting abnormalities within the scan image, and
a history generating unit for generating detection information of each of the abnormalities detected by the image inspection unit and generating a history image by embedding the detection information in areas of the scan image where the abnormalities were detected by the image inspection unit;
a storage device for storing the history image; and
a user terminal for displaying an abnormality detection result by the image inspection unit by using the history image and inputting a user's evaluation of the abnormality detection result, wherein
the image forming apparatus further includes a parameter setting unit for finally determining the abnormalities within the scan image depending on the user's evaluation input in the user terminal, and determining and setting abnormality detection parameters to be used in the image inspection unit such that the abnormalities finally determined are detected, and the abnormalities not finally determined are not detected.

2. The image forming system according to claim 1, wherein
the user terminal displays the scan image and abnormality detection information within the history image as the abnormality detection result, and inputs a user's evaluation of whether or not each of the abnormalities within the scan image is an abnormality to be detected.

3. The image forming system according to claim 1, wherein
the user terminal deletes, adds, or changes the abnormality detection information within the history image depending on the user's evaluation, and generates a modified history image, and
the parameter setting unit finally determines the abnormalities within the scan image, based on the abnormality detection information within the modified history image.

4. The image forming system according to claim 3, wherein
the parameter setting unit stores the scan image within the modified history image as an image for learning in the storage device when new detection information of abnormalities is added in the modified history image.

5. The image forming system according to claim 3, wherein
the user terminal further inputs a reason for the user's evaluation, embeds the input reason for evaluation in the scan image, and generates the modified history image.

6. The image forming system according to claim 1, wherein
the parameter setting unit individually determines each of the detection parameters when the image inspection unit switches the abnormality detection parameters to be used depending on a type of an abnormality to be detected, or for each partial image area.

7. The image forming system according to claim 6, wherein the partial image area is an image area having an identical image attribute.

8. The image forming system according to claim 1, wherein
the parameter setting unit stores the abnormality detection parameters determined in the storage device in association with at least one of a type of a sheet used for formation of the image, a requester for formation of the image, and an evaluator of the abnormality detection result.

9. The image forming system according to claim 1, wherein
the parameter setting unit creates a list of either or both of a page in which the abnormalities finally determined are detected and a page in which the abnormalities finally determined are not detected, and
the user terminal displays the list.

10. The image forming system according to claim 1, wherein
the parameter setting unit notifies a user of contradiction when the user's evaluation of the abnormality detection result includes the contradiction.

11. The image forming system according to claim 1, wherein
the parameter setting unit determines the abnormality detection parameters such that abnormalities evaluated as abnormalities not to be detected by the user are also detected when the user's evaluation of the abnormality detection result includes the contradiction.

12. The image forming system according to claim 1, wherein,
during initialization of the abnormality detection parameters,
the image inspection unit detects all abnormalities that can be detected from the scan image by using a detection parameter with which the abnormalities are most easily detected of the multiple detection parameters that can be used, and
the parameter setting unit determines and initializes the abnormality detection parameters such that abnormalities evaluated as abnormalities to be detected by the user are detected, and the abnormalities evaluated as abnormalities not to be detected are not detected, of all the abnormalities detected by the image inspection unit.

13. The image forming system according to claim 12, wherein
the image inspection unit further detects abnormalities from the scan image by using detection parameters currently set, and
the user terminal displays abnormality detection results by respective ones of the detection parameter with which the abnormalities are most easily detected and the detection parameter currently set.

14. The image forming system according to claim 1, wherein,
during initialization of the abnormality detection parameters,
the image forming unit forms on the sheet sample images of different levels of abnormalities that can be detected by using a detection parameter with which the abnormalities are most easily detected of the multiple detection parameters that can be used by the image inspection unit, and
the parameter setting unit determines and initializes the abnormality detection parameters such that the abnormalities evaluated as abnormalities to be detected by the user are detected, and the abnormalities evaluated as abnormalities not to be detected are not detected, of the abnormalities of the sample images.

15. The image forming system according to claim 1, wherein
a file format of the history image is PDF, and
the abnormality detection information is embedded by using at least one of a bookmark, a note annotation, and a text annotation of the PDF.

16. An image forming apparatus comprising:
an image forming unit for forming an image on a sheet;
an image reading unit for reading a sheet surface on which the image is formed and generating a scan image;
an image inspection unit for detecting abnormalities within the scan image;
a history generating unit for generating detection information of each of the abnormalities detected by the image inspection unit and generating a history image by embedding the detection information in areas of the scan image where the abnormalities were detected by the image inspection unit; and
a parameter setting unit for finally determining the abnormalities within the scan image depending on user's evaluation of an abnormality detection result by the image inspection unit, and determining and setting abnormality detection parameters to be used in the image inspection unit such that the abnormalities finally determined are detected, and the abnormalities not finally determined are not detected.

17. The image forming apparatus according to claim 16, wherein
the parameter setting unit stores the set abnormality detection parameters in an external storage device.

18. The image forming apparatus according to claim 16, wherein
the parameter setting unit acquires the abnormality detection parameters set depending on user's evaluation in another image forming apparatus, and sets the parameters as abnormality detection parameters to be used in the image inspection unit.

19. A non-transitory recording medium storing a computer readable program causing a computer to execute:
forming an image on a sheet by an image forming unit;
reading a sheet surface on which the image is formed by an image inspection unit and generating a scan image;
detecting abnormalities within the scan image by the image inspection unit;
generating detection information of each of the abnormalities detected by the image inspection unit and generating a history image by embedding the detection information in areas of the scan image where the abnormalities were detected by the image inspection unit, the generating of detection information and history image performed by a history generating unit; and
finally determining the abnormalities within the scan image depending on user's evaluation of an abnormality detection result by the image inspection unit, and determining and setting abnormality detection parameters to be used in the image inspection unit such that the abnormalities finally determined are detected, and the abnormalities not finally determined are not detected, by a parameter setting unit.

* * * * *